United States Patent
Nagaratnam et al.

(10) Patent No.: US 10,841,315 B2
(45) Date of Patent: Nov. 17, 2020

(54) ENHANCED SECURITY USING WEARABLE DEVICE WITH AUTHENTICATION SYSTEM

(71) Applicant: International Business Machines Corporation, Armonk, NY (US)

(72) Inventors: Nataraj Nagaratnam, Cary, NC (US); Pamela A. Nesbitt, Ridgefield, CT (US); Sandeep R. Patil, Pune (IN); Sachin C. Punadikar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/243,902

(22) Filed: Jan. 9, 2019

(65) Prior Publication Data

US 2019/0166130 A1 May 30, 2019

Related U.S. Application Data

(63) Continuation of application No. 15/250,400, filed on Aug. 29, 2016, now Pat. No. 10,243,961.

(51) Int. Cl.
| | |
|---|---|
| *H04L 29/06* | (2006.01) |
| *H04W 12/06* | (2009.01) |
| *H04W 12/08* | (2009.01) |

(52) U.S. Cl.
CPC ........ *H04L 63/102* (2013.01); *H04L 63/0853* (2013.01); *H04W 12/0608* (2019.01); *H04W 12/0804* (2019.01)

(58) Field of Classification Search
CPC ..... H04W 12/06; H04W 12/08; H04W 12/12; H04W 12/0608; H04W 12/0804;

(Continued)

(56) References Cited

U.S. PATENT DOCUMENTS

| 9,436,820 B1 | 9/2016 | Gleichauf et al. |
| 2002/0087894 A1* | 7/2002 | Foley ............... H04L 63/083 726/4 |

(Continued)

FOREIGN PATENT DOCUMENTS

| WO | 2012170283 | 12/2012 |
| WO | 2014143965 | 9/2014 |

OTHER PUBLICATIONS

Casale et al., "Personalization and user verification in wearable systems using biometric walking patterns," Personal and Ubiquitous Computing, Jun. 2012 (accepted Apr. 2011), vol. 16, Issue 5, pp. 563-580.

(Continued)

*Primary Examiner* — Jung W Kim
*Assistant Examiner* — Adrian Stoica
(74) *Attorney, Agent, or Firm* — VanLeeuwen & VanLeeuwen; Robert Sullivan

(57) ABSTRACT

An approach is provided that registers a wearable device in response to receiving a registration request that includes a set of acceptable user states and a corresponding set of acceptable times to perform a set of actions. When the approach receives a request from the user of the network-accessible site to perform a selected one of the set of actions, the approach transmits an inquiry to the wearable device registered to the user. Then, the approach receives a current state of the user from the wearable device responding to the transmitted state inquiry and determines a current time. In turn, the approach performs the selected action at the network-accessible site in response to determining that the received current state of the user matches one of the set of acceptable states and the current time matches one of the set of acceptable times.

17 Claims, 6 Drawing Sheets

(58) Field of Classification Search
CPC ... H04L 63/08; H04L 63/0815; H04L 63/083;
H04L 63/0838; H04L 63/0846; H04L
63/0853; H04L 63/0861; H04L 63/0876;
H04L 63/10; H04L 63/102; H04L 63/105;
H04L 63/107; G06F 21/30; G06F 21/31;
G06F 21/316; G06F 21/32; G06F 21/34;
G06F 21/35; G06F 21/42; G06F 21/43;
G06Q 30/00; G06Q 30/02; G06Q 30/04;
G06Q 30/06
See application file for complete search history.

(56) References Cited

U.S. PATENT DOCUMENTS

| | | |
|---|---|---|
| 2013/0194066 A1 | 8/2013 | Rahman et al. |
| 2014/0085050 A1 | 3/2014 | Luna et al. |
| 2014/0089672 A1 | 3/2014 | Luna et al. |
| 2014/0188638 A1 | 7/2014 | Jones et al. |
| 2014/0249853 A1 | 9/2014 | Proud et al. |
| 2014/0282868 A1 | 9/2014 | Sheller et al. |
| 2014/0282877 A1 | 9/2014 | Mahaffey et al. |
| 2015/0070134 A1 | 3/2015 | Nagisetty et al. |
| 2015/0121506 A1 | 4/2015 | Cavanaugh |
| 2015/0382195 A1 | 12/2015 | Grim et al. |
| 2016/0182404 A1* | 6/2016 | Rastogi .............. H04L 47/829 709/225 |
| 2018/0063149 A1 | 3/2018 | Nagaratnam et al. |

OTHER PUBLICATIONS

Bajrami et al., "Towards an automatic gait recognition system using activity recognition (wearable based)," Third International Workshop on Security and Communication Networks (IWSCN), May 2011, Gjovik, Norway, pp. 23-30.

Anonymous, "Method and system for providing integrated and convenient two-factor authentication with mobile device bound public key infrastructure," IP.com No. 000224396, Dec. 2012, 6 pages.

Peterson et al., "Enhancements for Authenticated Identity Management in the Session Initiation Protocol," Internet Society Requests for Comment, RFC4474, Aug. 2006, 43 pages.

Morrison, "Wearable Devices and the Future of Two Factor Authentication," Cyphercor Inc., Dec. 2013, 6 pages.

Jegher, "Wearable devices and the future of authentication," Celent Banking Blog, Nov. 2014, 4 pages.

Sandala, "Is wearable technology worth buying yet?," Banrate.com, Sep. 2014, 3 pages.

"The Future of Wearable Tech," Slideshow Transcript from PSFK, Jan. 2014, 28 pages.

Nazarov, "A New Breed of Wearables Shows Promise for Public Safety," SlateTech, Sep. 2014, 5 pages.

"List of IBM Patents or Patent Applications Treated as Related," Letter from Leslie A. Van Leeuwen, Jan. 9, 2019, 1 page.

* cited by examiner

ENHANCED SECURITY USING WEARABLE DEVICE WITH AUTHENTICATION SYSTEM

BACKGROUND OF THE INVENTION

Technical Field

This disclosure relates to enhanced security at secured network-accessible sites. In particular, this disclosure relates to enhanced security that utilizes a wearable device worn by a user of the network-accessible site.

Description of Related Art

Malevolent users, often referred to as "hackers," routinely access accounts of others in order to steal other people's identities and financial resources. Similarly, these hackers routinely attempt illegal accesses of large organizations' systems leading to theft of important data, information about their users and the like. For large organizations, such as banks, such attacks can lead to financial loss and also damages to the organizations' reputations. Such attacks impact future business and revenue of the organizations. In many cases, the malevolent user gains access using valid credentials, which makes the attack difficult to detect and stop. Consider an example, where a person's bank account is hacked and his money gets transferred to another account. If the account access and transfer is performed by the hacker using valid credentials, traditional system processing does not interrupt or halt the transaction.

SUMMARY

An approach is provided for securing a network-accessible site. The approach registers a wearable device in response to receiving a registration request from a user. The registration request includes a set of acceptable user states and a corresponding set of acceptable times to perform a set of actions. In response to registering the wearable device, the approach receives a request from the user of the network-accessible site to perform a selected one of the set of actions. The approach transmits an inquiry to the wearable device registered to the user in response to receiving the request and determines a current time in response to receiving a current state of the user from the wearable device responding to the transmitted state inquiry. In turn, the approach performs the selected action at the network-accessible site in response to determining that the received current state of the user matches one of the set of acceptable states and the current time matches one of the set of acceptable times.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
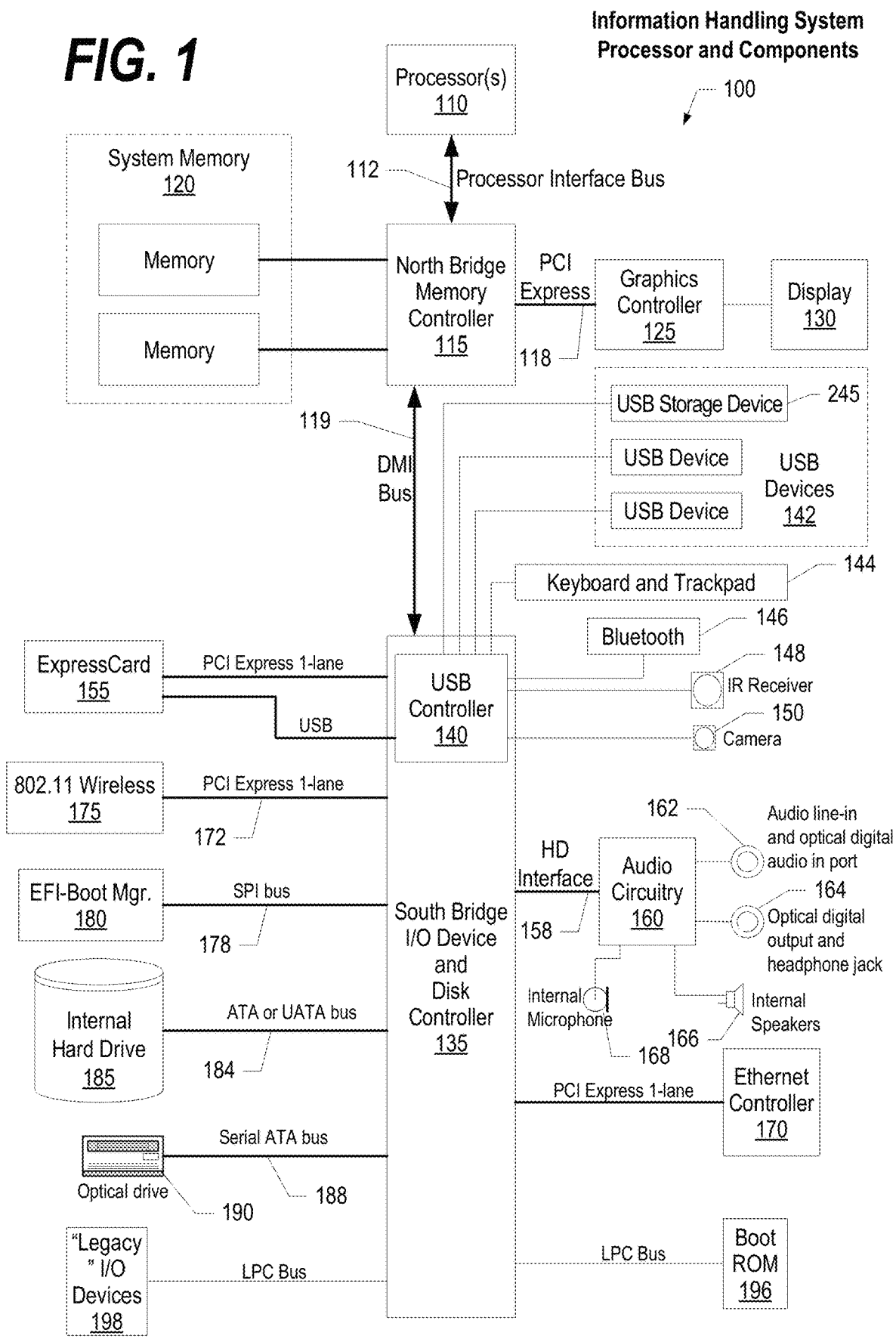
FIG. 1 depicts a block diagram of a processor and components of an information handling system.

The present invention may be a system, a method, and/or a computer program product. The computer program product may include a computer readable storage medium (or media) having computer readable program instructions thereon for causing a processor to carry out aspects of the present invention.

FIGS. 1-6 show an approach for using a wearable device to better secure a network-accessible site such as a bank, financial institution, or even a computer system at the user's home, such as a home automation or security system. In this proposed method, the system will consider inputs from these wearable devices to make sure that the access is being made by the person himself and its not a hacker attempting to gain access to the network-accessible site. The access validation method checks the data received from the user's pre-registered wearable smart device. This data inform the system regarding the user's current state, such as whether the person is sitting, standing, swimming, sleeping, in motion (walking, running), or away from his computing device such as laptop, mobile etc. This way the access validation system ensures that the user in question is in a state where the user can be actually be accessing the system. This approach can reduce large number of hacking attempt made by hacker/wrong person to the key data.

Following are a description and overview of the implementation steps. First, the user registers his/her wearable smart device with the system (e.g., banking system, organization, financial system, home-based system, etc.). Second, the user access validation method is determined where the "state" of the person during the transaction time is verified via a pre-registered wearable computing device. Actions, such as transactions, are performed if the state of the user is among the states where the action is permissible. For example, if a requested action is to transfer funds from the user's bank account but the wearable device senses that the user is sleeping, then this current state would not permit the to perform the action and the action is rejected. Similarly, if wearable device reports that the user is sitting at a desk, then the action may be performed. Alternatively, the pre-registered device might also send biometric information of the person wearing the device taken at that very point, just to ensure that the "state" is actually of the person to whom the wearable device belongs and not the state of a person, such as a hacker, that is attempting to fraudulently gain access to the network-accessible site. Thirdly, when there is doubt about whether the accessing user is really the intended user, the system might show dummy data (not so usable) and flash a message to personally call/meet the respective validating authority in the organization.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
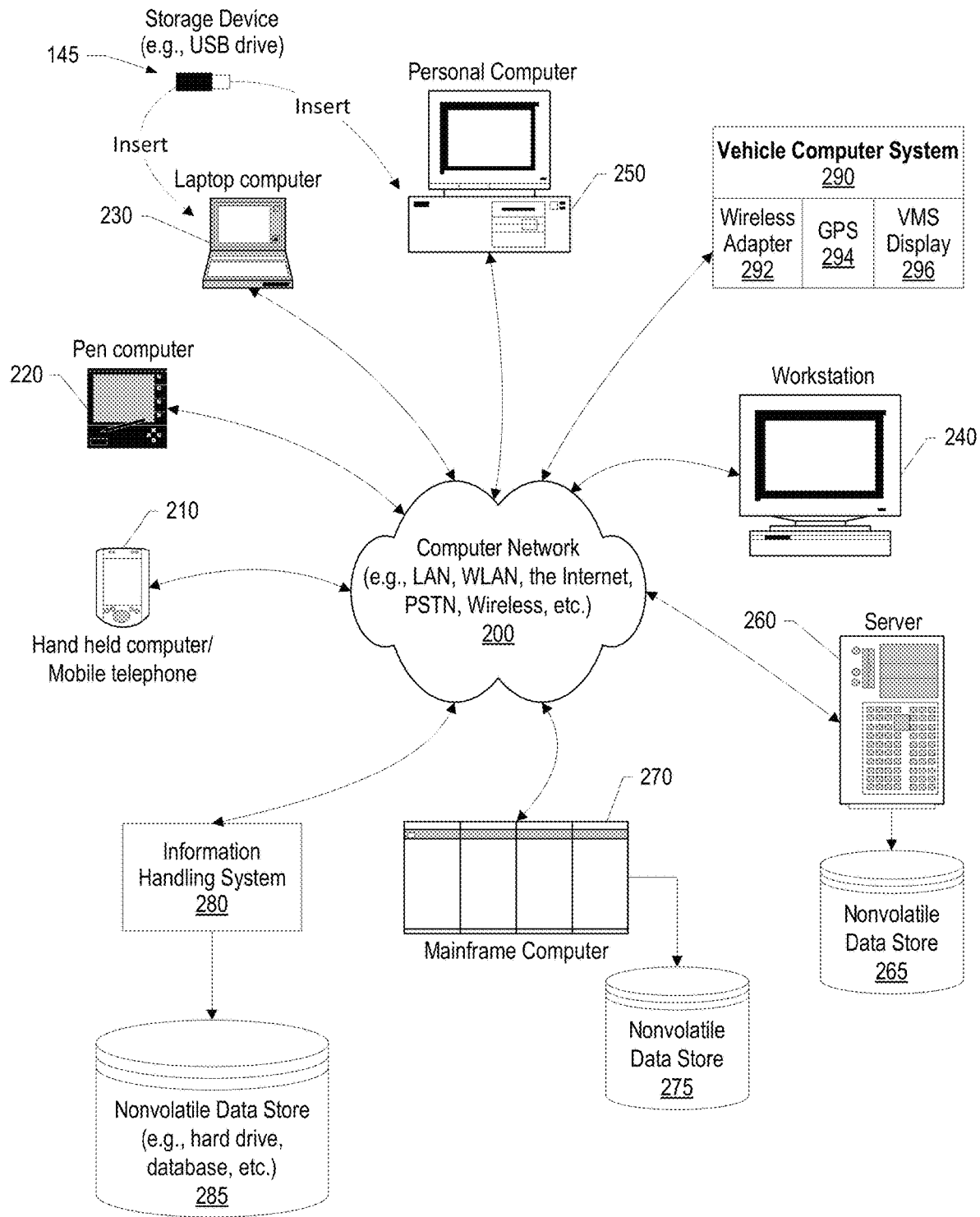
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
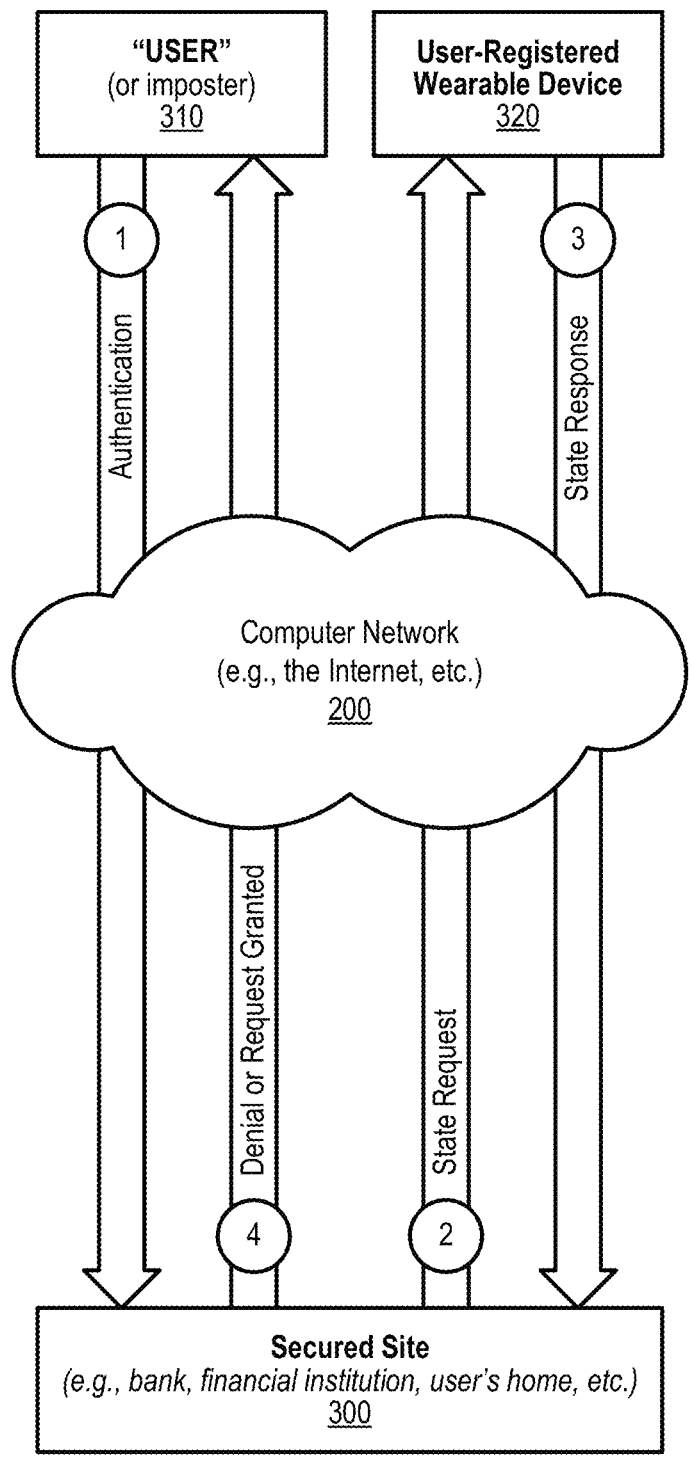
FIG. 3 is a component diagram depicting an exemplary environment where a user-registered wearable device is used to better secure a secured site accessible by the user.

FIG. 3 is a component diagram depicting an exemplary environment where a user-registered wearable device is used to better secure a secured site accessible by the user. In the embodiment shown, secured site 300 is a network-accessible site that is accessed by various users via computer network 200, such as the Internet. Examples of such secured sites include on-line banks, on-line financial institutions, a person's network-accessible home system, such as a home security system or home automation system, and any secured on-line site.

At step 1, user 310 accesses secured site 300 by providing logon credentials, such as a user identifier and password, which are used to authenticate the user to the secured site. However, if the user is actually an imposter that obtained the logon credentials through fraudulent means, such as hacking the actual user's computer system or videotaping or otherwise recording as the actual user entered the logon credentials. For example, in some automatic teller machine (ATM) hacks, malevolent users have obtained the actual user's ATM card data by using a dummy ATM interface and have further obtained the user's personal identification number (PIN code) by recording the user's keystrokes, observing the user as the PIN code was entered, or videotaping the user and he or she entered the PIN code at the ATM machine. Now, armed with the logon credentials (ATM card data and PIN code), the malevolent user user's the user's ATM card (if such card was stolen at the dummy ATM machine) and the obtained PIN code to access the user's bank account through a different ATM machine.

However, rather than granting the user, who might be an imposter as described above, access to the secured site, a process is performed to further secure the site. At step 2, the secured site transmits a state inquiry to a wearable device that was previously registered to the actual user of the bank account. At step 3, the wearable device, worn by the actual user of the account, transmits a state response back to the secured site informing the secured site of the current user state of the actual user. For example, the current user state might be sitting, standing, running, walking, driving, sleeping, swimming, or some other state. Using the ATM example from above, such hackers often attempt to steal money from customer's accounts using ATMs very late at night while the bank is closed and few people are around to observe or witness the fraudulent ATM transaction. In addition, the hacker might wear clothing to cover his or her face to hide their identity so that any cameras installed in the ATM do not capture the hacker's image. Such facial covering might be suspicious during the daytime hours, further encouraging the hacker to perform the activity late at night. So, in the ATM example, it might be likely that the actual user is sleeping at such a late hour. The process performed by the secured site would determine that the action (e.g., ATM withdrawal of funds, etc.) should be disallowed because the user's current state (e.g., sleeping, etc.) does not permit the action.

While the steps shown in FIG. 3 may thwart a malevolent user's attempt to perform an action on a user's account, those same steps would allow the actual user to perform the action. For example, if the actual user needed to withdraw money late at night and drove to an ATM machine and requested to withdraw money from his or her account, the secured site would check and see that the user's current state (e.g., standing in front on the ATM machine, sitting in a stopped vehicle outside an ATM machine, etc.) allows the action and, consequently, the requested action (withdraw money) would be performed in response to the current user state allowing the action to be performed at the site by the user.

Figure 4:
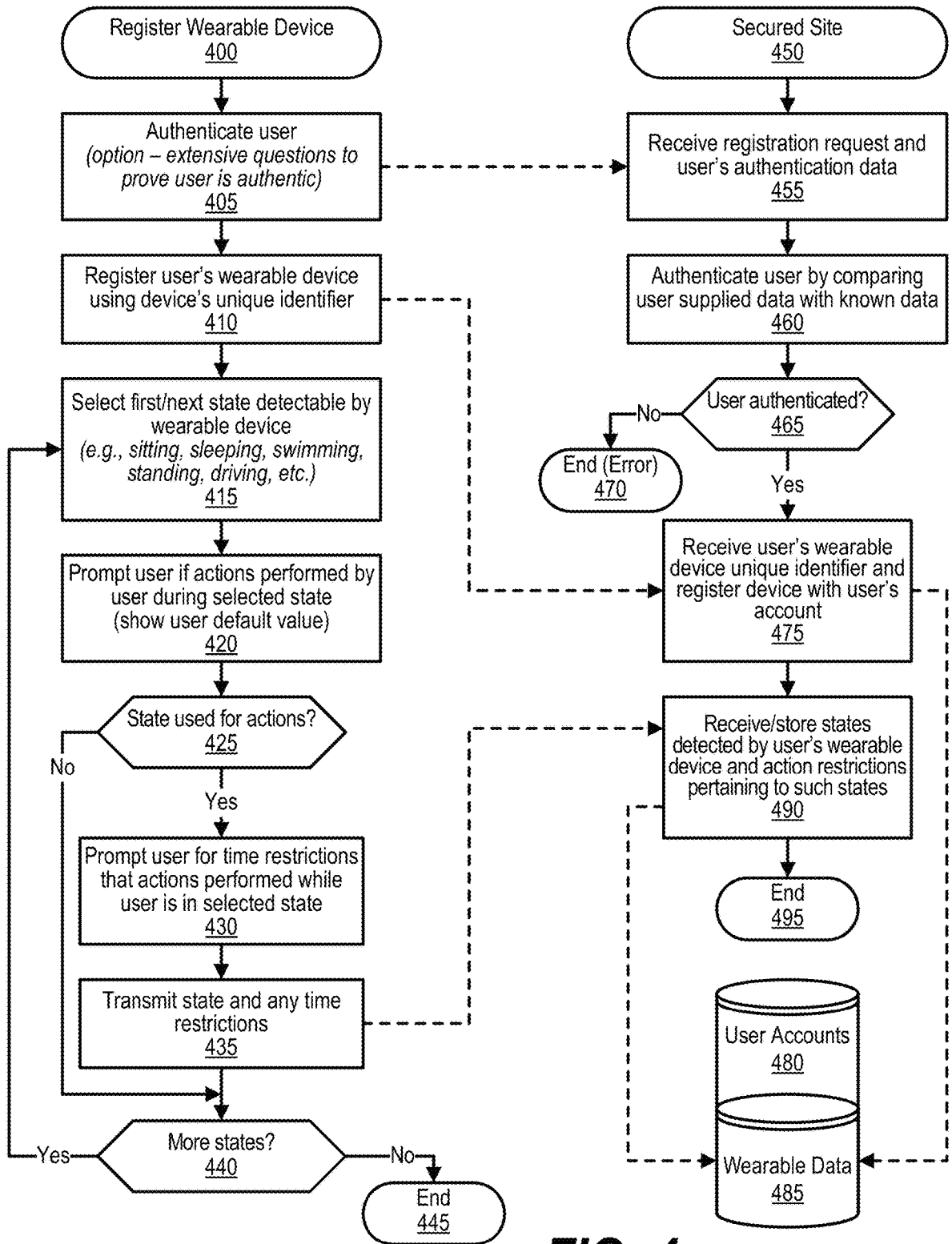
FIG. 4 is a flowchart showing registration of the wearable device with the secured site and further configuration of the user states detectable by the wearable device.

FIG. 4 is a flowchart showing registration of the wearable device with the secured site and further configuration of the user states detectable by the wearable device. FIG. 4 processing commences at 400 and shows the registration steps taken by the user with the wearable device. At step 405, the process authenticates the user by validating the user's logon credentials, such as the user's identifier and password. In one embodiment, the process prompts the user with more extensive questions, such as information such as the user's birth date, birthplace, other identifier data, and the like to ensure that the user is authentic and is not an imposter. The authentication data is provided by the user and transmitted back to the secured site. At step 410, the process registers user's wearable device using device's unique identifier, such as a serial number, MAC address, etc. that is unique to the device. This registration data is transmitted from the user's wearable device to the secured site.

At step 415, the process selects the first state detectable by the wearable device (e.g., sitting, sleeping, swimming, standing, driving, etc.). At step 420, the process prompts the user if actions should be performed (allowed) by user when the user is in the selected state. In addition, the process shows the user the default value for the selected state allowing the user to select the default value. For example, perhaps the user uses a wheelchair for mobility and cannot walk or stand. The default might be to allow actions when the user is standing. However, this user might choose to change the value so that a user that is standing is deemed to be an imposter as this particular user does not stand when accessing the secured site. The selected state and whether the selected state is an allowable state for the user to be in when performing actions at the secured site is transmitted back to the secured site.

The process determines as to whether the selected state was deemed allowable for actions at the site (decision 425). If the selected state was deemed allowable for actions at the site, then decision 425 branches to the 'yes' branch to process steps 430 and 435. At step 430, the process prompts the user for time restrictions when actions can be performed while user is in selected state. At step 435, the process transmits the selected state and any time restrictions to the secured site. Returning to decision 425, if the selected state was not deemed allowable for actions at the site, then decision 425 branches to the 'no' branch bypassing steps 430 and 435.

The process determines as to whether more states to select and process as described above (decision 440). If more states to select and process as described above, then decision 440 branches to the 'yes' branch which loops back to step 415 to select the next state detectable by the user's wearable device. This looping continues until there are no more states to select and process, at which point decision 440 branches to the 'no' branch and registration performed by the user with the wearable device ends at 445.

Secured site processing commences at 450 and shows the steps taken by the secured site to register a user's wearable device and selections at the site. At step 455, the process performed at the secured site receives registration request and user's authentication data. At step 460, the process performed at the secured site authenticates user by comparing user supplied data with known data. The process performed at the secured site determines as to whether user authenticated (decision 465). If user authenticated, then decision 465 branches to the 'yes' branch. On the other hand, if not user authenticated, then decision 465 branches to the 'no' branch whereupon processing performed at the secured site thereafter ends at 470.

At step 475, the process performed at the secured site receives the user's wearable device unique identifier and registers device with user's account. Step 475 stores the wearable device unique identifier in wearable data store 485 which is shown being a subset of user accounts data store 480. At step 490, the process performed at the secured site receives and stores the states detected by user's wearable device and the action restrictions pertaining to such states. FIG. 4 processing performed at the secured site thereafter ends at 495.

Figure 5:
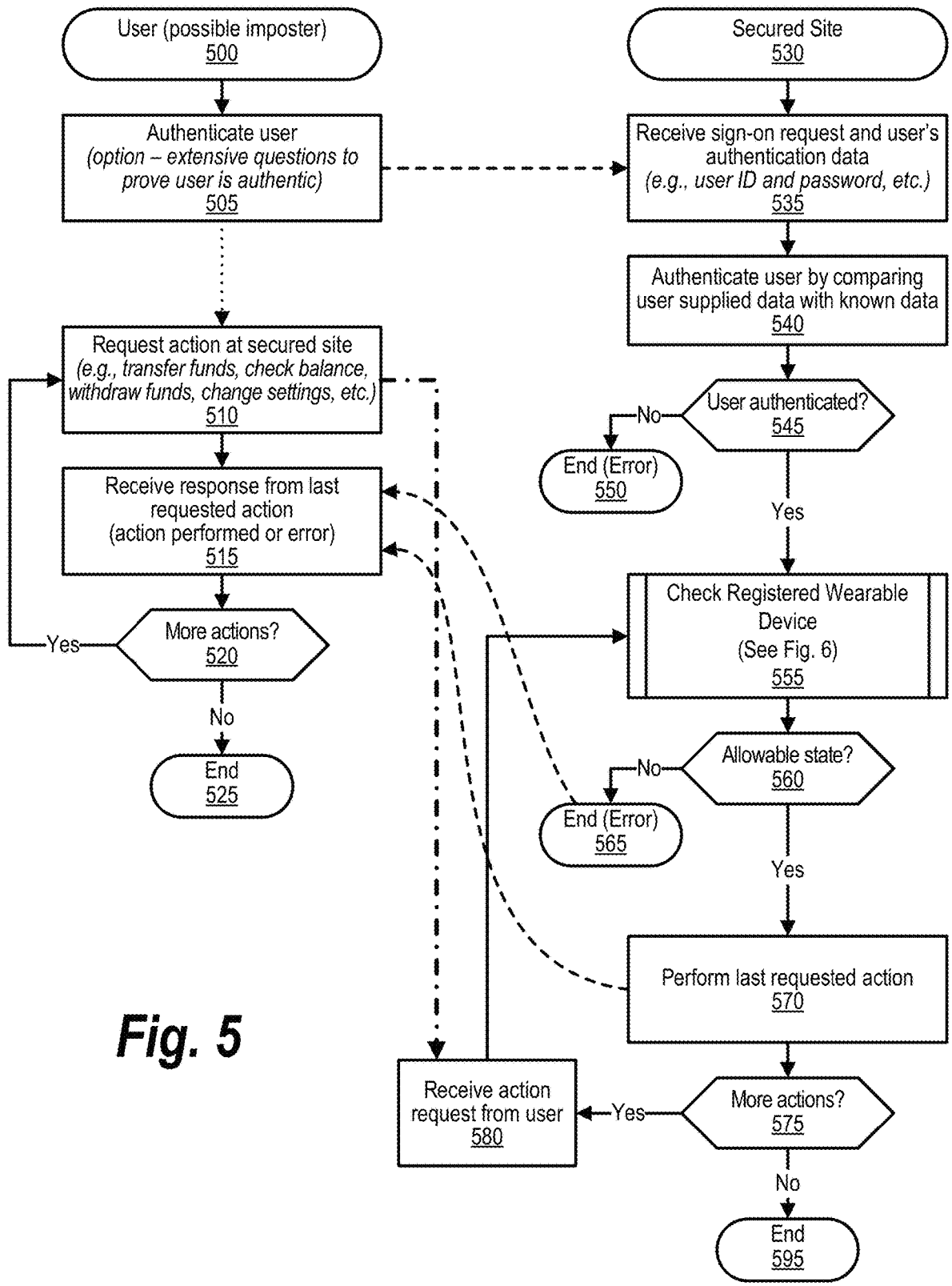
FIG. 5 is a flowchart showing steps between a user, or possible imposter, and the secured site utilizing enhanced security provided by the wearable device.

FIG. 5 is a flowchart showing steps between a user, or possible imposter, and the secured site utilizing enhanced security provided by the wearable device. FIG. 5 processing commences at 500 and shows the steps taken by the user attempting to perform actions at a secured site. The user might be an imposter who has fraudulently obtained the actual user's logon credentials (e.g., user identifier and password, PIN code, etc.). At step 505, the process authenticates the user. In one embodiment, the user is prompted for more extensive questions to show that the user is authentic.

If authentication of the user was successful, then at step 510, the user requests an action to be performed at the secured site after the user has successfully accessed the site. The action might be to transfer funds, check the user's balance, withdraw funds, change settings, etc. At step 515, the user receives a response from the secured site pertaining to the last action that the user requested. The response is likely either that the action was performed or an error was encountered, such as further authentication of the user by utilizing the user' registered wearable device failed.

The process determines as to whether more actions are being performed by the user on the secured site (decision 520). If more actions are being performed by the user on the secured site, then decision 520 branches to the 'yes' branch which loops back to step 510 to receive and process the next user action request as described above. This looping continues until either an error is encountered (e.g., user not authenticated due to registered wearable device reporting user is in a state that disallows actions at the secured site, etc.) or the user logs off the secured site, at which point decision 520 branches to the 'no' branch exiting the loop and the user processing shown in FIG. 5 thereafter ends at 525.

Secured site processing commences at 530 and shows the steps taken by the secured site in processing action requests received by the user. At step 535, the process performed by the secured site receives the sign-on request and the user's logon credentials (e.g., user ID and password, PIN code, etc.) that are used to gain access to the secured site. At step 540, the process performed by the secured site authenticates user by comparing the user supplied logon credentials with known data, such as an expected password or PIN code. The process performed by the secured site determines whether the user was successfully authenticated (decision 545). If the user was successfully authenticated, then decision 545 branches to the 'yes' branch for further processing. On the other hand, if the user was not successfully authenticated, then decision 545 branches to the 'no' branch whereupon secured site processing of this user ends at 550.

Figure 6:
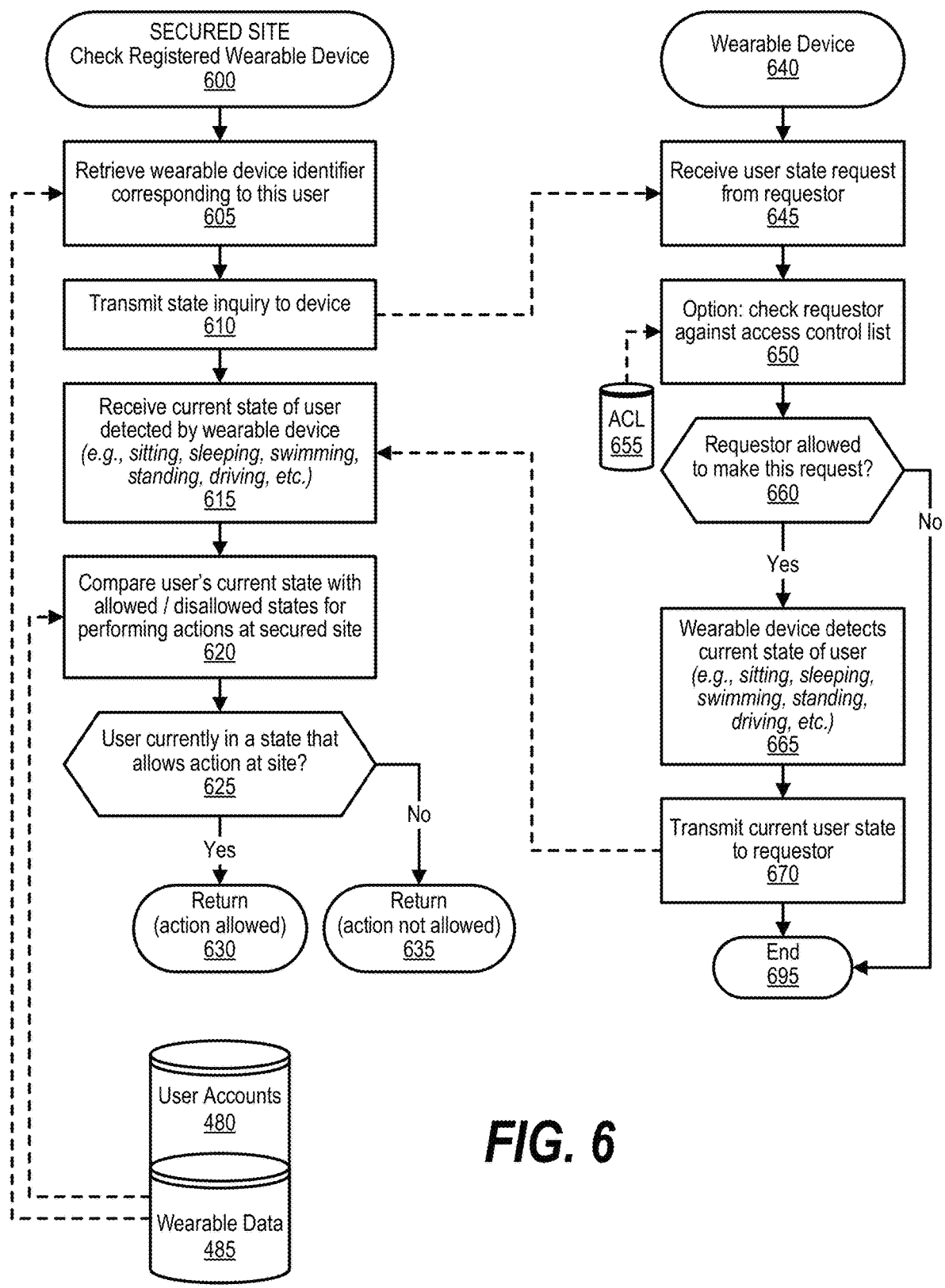
FIG. 6 is a flowchart showing detailed steps where the secured site checks the state of the user by utilizing the registered wearable device to enhance security of the site.

At predefined process 555, the process performed by the secured site performs the Check Registered Wearable Device routine (see FIG. 6 and corresponding text for processing details). Predefined process 555 receives data from the user's wearable device pertaining to the user's current state (e.g., sitting, standing, sleeping, driving, etc.) and further determines whether the requested action is allowable while the user is in the current user state. For example, if the user is found to be currently sleeping, then it is likely that an imposter is attempting to access the user's account and perform malevolent actions. The process performed by the secured site determines as to whether the user is in a current state that allows the action to be performed (decision 560). If the user is in a current state that allows the action to be performed, then decision 560 branches to the 'yes' branch whereupon, at step 570, the secured site performs the action requested by the user. On the other hand, if the user is in a current state that disallows the action to be performed, then decision 560 branches to the 'no' branch whereupon the session established with the user, likely an imposter, is terminated and processing performed by the secured site ends at 565.

The process determines as to whether more actions are received from this user (decision 575). If more actions are received from this user, then decision 575 branches to the 'yes' branch whereupon, at step 580, the process receives the next action request from user and processing loops back to predefined process 555 to check the user's current state via the registered wearable device and processes the requested action as described above. This looping continues until there are no more actions received from this user (e.g., user logs off the secured site or the session with the secured site is terminated due to a disallowed user state being detected by the user's wearable device, at which point decision 575 branches to the 'no' branch exiting the loop whereupon secured site processing of the user ends at 595.

FIG. 6 is a flowchart showing detailed steps where the secured site checks the state of the user by utilizing the registered wearable device to enhance security of the site. Secured site processing in FIG. 6 commences at 600 and shows the steps taken by the secured site to check the user's registered wearable device. At step 605, the process retrieves the wearable device identifier corresponding to this user from wearable device data store 485. At step 610, the secured site process transmits a state inquiry to device utilizing the wearable device unique identifies to contact the device (e.g., over the Internet and a wireless network that transmits the inquiry to the wearable device, etc.).

At step 615, the secured site process receives, from the user's registered wearable device, the current state of the user as detected by the wearable device. For example, the current user state might be sitting, sleeping, swimming, standing, driving, etc. At step 620, the secured site process compares the user's current state with allowed and disallowed states for performing actions at secured site. The allowed and disallowed states, if configured by the user, are retrieved from wearable device data store 485. In one embodiment, default values are used for allowed and disallowed states if not configured by the user.

The secured site process determines as to whether the user is currently in a state that allows the action to be performed at the secured site (decision 625). If the user is currently in a state that allows the action to be performed at the secured site, then decision 625 branches to the 'yes' branch whereupon processing returns to the calling routine (see FIG. 5) at 630 with a return code indicating that the current user state allows the action to be performed. On the other hand, if the user is not currently in a state that allows the action to be performed at the secured site, then decision 625 branches to the 'no' branch whereupon processing returns to the calling routine (see FIG. 5) at 635 with a return code indicating that the current user state disallows the action from being performed.

Wearable device processing shown in FIG. 6 commences at 640 and shows the steps taken at the registered wearable device to respond to state inquiries. At step 645, the wearable device receives a user state inquiry from a requestor, such as the secured site. At step 650, the process optionally checks the requestor against an access control list. A list of requestors that have been allowed to access the wearable device is retrieved from ACL data store 655. The wearable device determines as to whether this requestor is allowed to make the state inquiry request (decision 660). If this requestor is allowed to make the state inquiry request, then decision 660 branches to the 'yes' branch for further processing of the inquiry request by steps 665 and 670. On the other hand, if this requestor is not allowed to make the state inquiry request, then decision 660 branches to the 'no' branch bypassing steps 665 and 670.

At step 665, the wearable device detects the current state of user, such as whether the user is sitting, sleeping, swimming, standing, driving, etc. At step 670, the wearable device transmits the current user state back to the requestor. Wearable device processing thereafter ends at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for securing a network-accessible site, the method comprising:
  registering a wearable device at a network-accessible site in response to receiving a registration request from a user, wherein the registering comprises:
    storing a first acceptable user state and a corresponding first acceptable time determined by the user to perform one or more first actions from a set of actions, wherein the first acceptable user state indicates a body state of the user; and
    storing a second acceptable user state and a corresponding second acceptable time determined by the user to perform one or more second actions from the set of actions, wherein the second acceptable user state is different from the first acceptable user state and the second acceptable time is different from the first acceptable time;
  in response to registering the wearable device, receiving an action request from the user of the network-accessible site to perform the one or more first actions;
  transmitting an inquiry to the wearable device registered to the user in response to receiving the action request;
  receiving a current state of the user from the wearable device responding to the transmitted inquiry;
  determining that the received current state of the user matches the first acceptable user state;
  performing the one or more first actions at the network-accessible site in response to determining that a current time matches the first acceptable time; and
  prohibiting the one or more first actions at the network-accessible site in response to determining that the current time fails to match the first acceptable time.

2. The method of claim 1 wherein the registering further comprises:
  verifying an identity of the user; and
  associating the wearable device with the user.

3. The method of claim 1 further comprising:
  prior to receiving the action request from the user:
    receiving a set of logon credentials from the user; and
    successfully verifying the received set of logon credentials.

4. The method of claim 1 further comprising:
  receiving a set of logon credentials from the user; and
  successfully verifying the received set of logon credentials, wherein the action request is a logon request that includes the set of logon credentials, and wherein the at least one or more first actions is a site logon action.

5. The method of claim 1 further comprising:
  terminating a session established between the user and the network-accessible site in response to determining that the one or more first actions are disallowed at the current time.

6. The method of claim 1 wherein the current user state in which the one or more first actions are allowed is selected from a group consisting of a sitting user, and a standing user, wherein the current user state in which the one or more first actions are disallowed is selected from a group consisting of a running user, a walking user, a driving user, a sleeping user, and a swimming user.

7. An information handling system comprising:
  one or more processors;
  a memory coupled to at least one of the processors;
  a telecommunications adapter, accessible by at least one of the processors; and
  a set of instructions stored in the memory and executed by at least one of the processors to secure a network-accessible site, wherein the set of instructions perform actions of:
    registering a wearable device at a network-accessible site in response to receiving a registration request from a user, wherein the registering comprises:
      storing a first acceptable user state and a corresponding first acceptable time determined by the user to perform one or more first actions from a set of actions, wherein the first acceptable user state indicates a body state of the user; and
      storing a second acceptable user state and a corresponding second acceptable time determined by the user to perform one or more second actions from the set of actions, wherein the second acceptable user state is different from the first acceptable user state and the second acceptable time is different from the first acceptable time;

in response to registering the wearable device, receiving an action request from the user of the network-accessible site to perform the one or more first actions;

transmitting an inquiry to the wearable device registered to the user in response to receiving the action request;

receiving a current state of the user from the wearable device responding to the transmitted inquiry;

determining that the received current state of the user matches the first acceptable user state;

performing the one or more first actions at the network-accessible site in response to determining that a current time matches the first acceptable time; and prohibiting the one or more first actions at the network-accessible site in response to determining that the current time fails to match the first acceptable time.

8. The information handling system of claim 7 wherein the actions further comprise:

verifying an identity of the user; and associating the wearable device with the user.

9. The information handling system of claim 7 wherein the actions further comprise:

prior to receiving the action request from the user:

receiving a set of logon credentials from the user; and successfully verifying the received set of logon credentials.

10. The information handling system of claim 7 wherein the actions further comprise:

receiving a set of logon credentials from the user; and successfully verifying the received set of logon credentials, wherein the action request is a logon request that includes the set of logon credentials, and wherein the at least one or more first actions is a site logon action.

11. The information handling system of claim 7 wherein the actions further comprise:

terminating a session established between the user and the network-accessible site in response to determining that the one or more first actions are disallowed at the current time.

12. The information handling system of claim 7 wherein the current user state in which the one or more first actions are allowed is selected from a group consisting of a sitting user, and a standing user, wherein the current user state in which the one or more first actions are disallowed is selected from a group consisting of a running user, a walking user, a driving user, a sleeping user, and a swimming user.

13. A computer program product stored in a computer readable storage medium, comprising computer instructions that, when executed by an information handling system, causes the information handling system to perform actions comprising:

registering a wearable device at a network-accessible site in response to receiving a registration request from a user, wherein the registering comprises:

storing a first acceptable user state and a corresponding first acceptable time determined by the user to perform one or more first actions from a set of actions, wherein the first acceptable user state indicates a body state of the user; and storing a second acceptable user state and a corresponding second acceptable time determined by the user to perform one or more second actions from the set of actions, wherein the second acceptable user state is different from the first acceptable user state and the second acceptable time is different from the first acceptable time;

in response to registering the wearable device, receiving an action request from the user of the network-accessible site to perform the one or more first actions;

transmitting an inquiry to the wearable device registered to the user in response to receiving the action request;

receiving a current state of the user from the wearable device responding to the transmitted inquiry;

determining that the received current state of the user matches the first acceptable user state;

performing the one or more first actions at the network-accessible site in response to determining that a current time matches the first acceptable time; and prohibiting the one or more first actions at the network-accessible site in response to determining that the current time fails to match the first acceptable time.

14. The computer program product of claim 13 wherein the actions further comprise:

verifying an identity of the user; and associating the wearable device with the user.

15. The computer program product of claim 13 wherein the actions further comprise:

prior to receiving the action request from the user:

receiving a set of logon credentials from the user; and successfully verifying the received set of logon credentials.

16. The computer program product of claim 13 wherein the actions further comprise:

receiving a set of logon credentials from the user; and successfully verifying the received set of logon credentials, wherein the action request is a logon request that includes the set of logon credentials, and wherein the at least one or more first actions is a site logon action.

17. The computer program product of claim 13 wherein the actions further comprise:

terminating a session established between the user and the network-accessible site in response to determining that the one or more first actions are disallowed at the current time.

* * * * *